United States Patent
Olofsson et al.

(10) Patent No.: US 9,510,210 B2
(45) Date of Patent: Nov. 29, 2016

(54) METHOD AND APPARATUS OF PHYSICAL CELL IDENTIFIER ALLOCATION

(71) Applicant: HUAWEI TECHNOLOGIES CO., LTD., Shenzhen (CN)

(72) Inventors: Henrik Olofsson, Kista (SE); Xuelong Wang, Beijing (CN); Binsong Tang, Shanghai (CN); Huan Zhang, Shanghai (CN); Xiaoli Shi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/291,574

(22) Filed: May 30, 2014

(65) Prior Publication Data

US 2014/0295857 A1 Oct. 2, 2014

Related U.S. Application Data

(63) Continuation of application No. 13/303,832, filed on Nov. 23, 2011, now Pat. No. 8,744,505, which is a continuation of application No. 12/566,871, filed on Sep. 25, 2009, now abandoned.

(30) Foreign Application Priority Data

Sep. 25, 2008 (CN) .......................... 2008 1 0165942
Oct. 31, 2008 (CN) .......................... 2008 1 0174695

(51) Int. Cl.
*H04W 16/24* (2009.01)
*H04W 36/00* (2009.01)

(52) U.S. Cl.
CPC ......... *H04W 16/24* (2013.01); *H04W 36/0061* (2013.01)

(58) Field of Classification Search
CPC ......... H04J 11/0093; H04W 36/0083; H04W 16/24
See application file for complete search history.

(56) References Cited

U.S. PATENT DOCUMENTS

| | | |
|---|---|---|
| 2003/0227897 A1 | 12/2003 | Okada |
| 2006/0274780 A1 | 12/2006 | Walsh et al. |
| 2007/0097938 A1 | 5/2007 | Nylander et al. |
| 2007/0248068 A1 | 10/2007 | Onggosanusi et al. |

(Continued)

FOREIGN PATENT DOCUMENTS

| | | |
|---|---|---|
| CN | 1897741 A | 1/2007 |
| CN | 1897741 A | 1/2007 |

(Continued)

OTHER PUBLICATIONS

3GPP TS 36.423 V8.3.0 Sep. 2008; *Technical Specification*; 3$^{rd}$ Generation Partnership Project; Technical Specification Group Radio Access Network; Evolved Universal Terrestrial Radio Access Network (E-UTRAN); X2 application protocol (X2AP) (Release 8) (85 pgs.).

(Continued)

*Primary Examiner* — Myron K Wyche
(74) *Attorney, Agent, or Firm* — Staas & Halsey LLP

(57) ABSTRACT

A method and apparatus of allocating a Physical Cell Identifier (PCI) is disclosed in an embodiment of the present invention allowing different cells to operate on different frequencies while eliminating or reducing risk of PCI conflicts. Thereby PCI allocation is provided that is effective also in a multi-frequency environment.

15 Claims, 8 Drawing Sheets

(56) References Cited

U.S. PATENT DOCUMENTS

| | | | |
|---|---|---|---|
| 2009/0264130 A1* | 10/2009 | Catovic | ............ H04W 36/0083 455/436 |
| 2010/0208693 A1 | 8/2010 | Centonza | |
| 2010/0216468 A1 | 8/2010 | Kazmi et al. | |
| 2010/0323662 A1 | 12/2010 | Dahlen et al. | |
| 2011/0263282 A1* | 10/2011 | Rune | ................... H04J 11/0093 455/507 |

FOREIGN PATENT DOCUMENTS

| | | |
|---|---|---|
| CN | 1941998 A | 4/2007 |
| CN | 101119575 A | 2/2008 |
| CN | 101119575 A | 2/2008 |
| CN | 101146330 A | 3/2008 |
| CN | 101646225 A | 2/2010 |
| CN | 101646225 A | 2/2010 |

OTHER PUBLICATIONS

Office Action mailed Aug. 9, 2012, issued in parent U.S. Appl. No. 13/303,832 (13 pages).
Office Action mailed Jan. 30, 2013, issued in parent U.S. Appl. No. 13/303,832 (13 pages).
Office Action mailed Mar. 15, 2013, issued in related U.S. Appl. No. 12/566,871 (22 pages).
Office Action mailed Sep. 7, 2012, issued in related U.S. Appl. No. 12/566,871 (21 pages).
Notice of Allowance mailed Jan. 17, 2014, issued in parent U.S. Appl. No. 13/303,832 (17 pages).
Chinese Office Action mailed Jun. 3, 2013 in corresponding Chinese Patent Application No. 201110308521.X (6 pages) (5 pages English Translation).
Chinese Search Report mailed May 22, 2013 in Chinese Patent Application No. 20110308521.X (2 pages).
"*Agreement on Framework for PCI Selection*", 3GPP TSG-RAN WG3 #61, R3-082357, Qualcomm Europe, NSN, Orange, Vodafone, Telecom Italia, T-Mobile Alcatel-Lucent, Huawei, Aug. 18-22, 2008, Jeju Island, Korea, pp. 1-13.
"*SON Use Case: Cell Phy_ID Automated Configuration*", 3GPP TSG-RAN WG3 Meeting #59 R3-080376 Nokia Siemens Networks, Nokia Sorrento, Italy, Feb. 11-15, 2008, pp. 1-13.
Chinese Office Action mailed Jul. 25, 2013 in corresponding Chinese Patent Application No. 201110307844.7 (7 pages) (10 pages English Translation).
U.S. Appl. No. 13/303,832, filed Nov. 23, 2011, Olofsson et al., Huawei Technologies Co., Ltd. Shenzhen, P.R. China.
U.S. Appl. No. 12/566,871, filed Sep. 25, 2009, Olofsson et al., Huawei Technologies Co., Ltd. Shenzhen, P.R. China.

\* cited by examiner

METHOD AND APPARATUS OF PHYSICAL CELL IDENTIFIER ALLOCATION

CROSS-REFERENCE TO RELATED APPLICATIONS

This application is a continuation of U.S. patent application Ser. No. 13/303,832, filed on Nov. 23, 2011, which is a continuation of U.S. patent application Ser. No. 12/566,871, filed on Sep. 25, 2009, which claims the priority of Chinese patent application No. 200810165942.X filed on Sep. 25, 2008 and Chinese patent application No. 200810174695.X filed on Oct. 31, 2008. The afore-mentioned patent applications are hereby incorporated by reference in their entireties.

TECHNICAL FIELD

The present invention relates to the communication field, and in particular, to a method and apparatus of Physical Cell Identifier (PCI) allocation in cellular mobile communication systems.

BACKGROUND

The radio performance in the $3^{rd}$ Generation (3G) network has been improved greatly. However, from the perspective of commercial operation, the operator needs to reduce costs of network construction and operation so as to win the markets with more cost-efficient network services for the users. The linchpin of reducing the operation cost is to reduce the network planning and network optimization processes that involve manual operation, thereby enhancing the network automation functions. Consequently, PCT automatic allocation is an important content of the radio network system planning and optimization currently.

The automatic allocation of PCIs is performed by an Evolved Node B which is also called an eNB. The automatic allocation aims to allocate a proper PCI automatically for the newly introduced cell of the eNB. According to the protocol, there are 504 available PCIs in total. Therefore, in the practical networking, it is necessary to multiplex such PCIs. If the PCIs are allocated improperly, the PCI may conflict between the cells. Given below are two examples of the conflict:

I. As shown in FIG. 1, there are three cells: cell 1 (101), cell 2 (102), and cell 3 (103). Cell 1 and cell 3 work under the same frequency, and their PCI is the same, namely, PCIA; cell 2 is direct neighbor of cell 1 and cell 3. (Two cells in radio-sense adjacent to each other or (partially) overlapping as regards geographical radio coverage are examples of direct neighbors); and the PCI of cell 2 is PCIB. When the User Equipment (UE) in cell 2 initiates a handover request, the UE detects cell 1 and cell 3. Because cell 1 and cell 3 have the same PCI, the eNB of cell 2 is unable to determine which cell can serve as a target cell according to the PCI, and the eNB is unable to notify the UE to hand over.

II. As shown in FIG. 2, there are two adjacent cells: cell 1 and cell 2. Cell 1 is partially overlapping with cell 2; cell 1 and cell 2 are working under the same frequency and have the same PCI, namely, PCIA. If the UE is in the overlap of cell 1 and cell 2, the UE can detect at most one cell.

In order to avoid the foregoing conflict, precise planning need be performed at the time of allocating the PCI to the cell.

The existing standard provides a mechanism of allocating the PCIs in a same-frequency scenario as follows. When an eNB is started, the eNB obtains the PCI used by one or more cells neighboring the one or more cells of the started eNB through an X2 or S1 interface message. Therefore, a PCI unused by the adjacent cell of the cell under the new eNB is allocated to the cell under the new eNB, and the foregoing conflict is avoided.

The foregoing method provides automatic allocation of PCI for cells operating on the same-frequency. According to prior art, for cells operating on disjoint frequencies, no corresponding mechanism is available to PCI allocation and PCI conflict therefore may occur.

SUMMARY

A method and apparatus of allocating PCI is disclosed. According to an aspect of the present invention, prior-art PCI conflict in a different-frequency scenario is overcome by obtaining neighboring cell information of cells neighboring to a first cell, the neighboring cell information including physical cell identifier information of cells which are neighboring to the cells neighboring to the first cell, and the cells neighboring to the first cell irrespective of whether the frequencies are identical or disjoint; and allocating, according to the neighboring cell information, a physical cell identifier for the first cell.

Also, according to an aspect of the invention PCI is allocated, and the transferred neighboring cell information preferably includes physical cell identifier information for neighboring cells also if operating on a frequency different from neighbor cell frequency.

According to an embodiment of the invention, an information obtaining module configured to obtain neighboring cell information of cells neighboring to a first cell, the neighboring cell information including physical cell identifier information of cells which are neighboring to the cells neighboring to the first cell, the cells neighboring to the first cell including one or more cells also if operating on a frequency different from a frequency of the first cell; an allocation module configured to allocate, according to the neighboring cell information obtained by the information obtaining module, a physical cell identifier for the first cell.

In an exemplary embodiment, a cell obtains neighbor cell information of a cell neighboring a newly activated cell. The neighboring cell information includes the neighboring cell information of the one or more cells also if operating on a frequency different from the frequency of the newly activated cell. According to the neighboring cell information, the PCI of the newly activated cell is obtained, thus accomplishing automatic allocation of PCIs also in a multi-frequency scenario and further improving the system's reliability.

Further, in an embodiment of the invention a PCI conflict or potential conflict is detected and PCI may be allocated also without full knowledge about all existing neighbor cells.

DETAILED DESCRIPTION

In order to accomplish automatic allocation of PCIs in a disjoint- or multi-frequency scenario, a method of PCI allocation is disclosed in an exemplary embodiment of the present invention as detailed below by reference to accompanying drawings.

Figure 9:
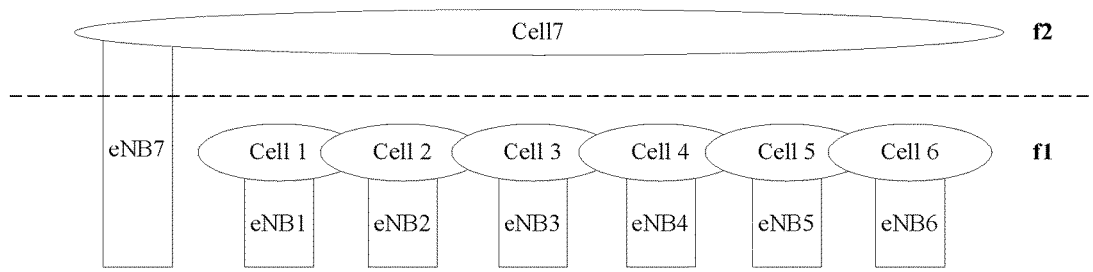
FIG. 9 shows an application scenario in an embodiment of the present invention.

For reasons of explanation and illustration of no limitation to the scope of invention, consider cell 3 of FIG. 9 being an activated cell, and eNB3 covering or serving cell 3.

As shown in FIG. 9, example cell 7 operates on frequency f2. Example cells 1-6 operate on frequency f1. Cells of different operating frequencies may have different radii or coverage areas also if served by one and the same eNB. Cell's 7 coverage area in the example is so big that the coverage area of each one of cells 1-6 is within the coverage area of cell 7, i.e. cells 1-6 are neighboring cell 7. In this non-exclusive example each eNB, eNB1-eNB7, serves a single cell Cell 1-Cell 7. Within the scope of invention, an eNB may serve one cell or a plurality of cells.

In a scenario described in relation to FIG. 9, if a UE in cell 7 need switch to a cell of frequency f1, PCI of each one of cells 1 to 7 shall be different from the PCI of any other cell among the cells 1 to 7 to avoid conflict.

Suppose, as an example, that cell 3 is a newly activated cell. First eNB serving cell 3 need consider both cell's 3 direct neighbor cells working under a frequency identical to the frequency of cell 3 (cell 2 and cell 4) and cell's 3 indirect neighbor cells working under a frequency identical to the frequency of cell 3 (cell 1, cell 5, and cell 6) of cell 3 when allocating a PCI to cell 3. Second, handover of a UE in cell 7 (operating on frequency f2) to a cell of frequency f1 is protected from errors if the PCI finally obtained by cell 3 is different from those of cells 1, 2, 4, 5, and 6. Prior art technology may detect cells which are direct or indirect neighboring cells (cells 1, 2, 4, and 5) and are operating on a frequency identical to the frequency of the cell 3, but does not necessarily detect a direct or indirect neighbor cell operating on a disjoint frequency. While cell 6 is a direct neighbor cell of cell 7 in a multi-frequency scenario, prior art technology may not detect cell 6.

Figure 1:
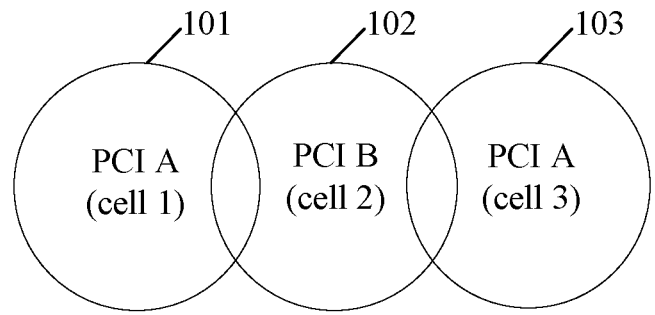
FIG. 1 shows a first scenario of PCI conflict known in prior art.
Figure 2:
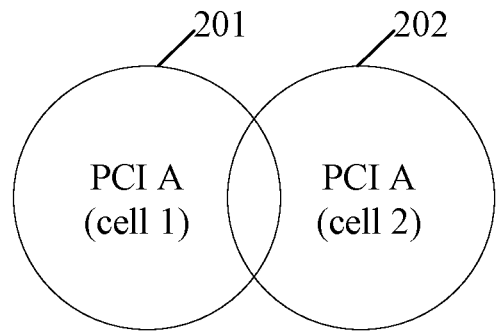
FIG. 2 shows a second scenario of PCI conflict known in prior art.
Figure 3:
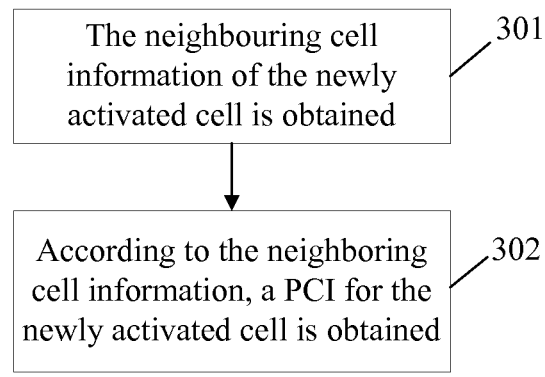
FIG. 3 is a flowchart of a method for allocating PCIs in an embodiment of the present invention.

FIG. 3 schematically illustrates an exemplary method of PCI allocation. The method includes:

301: Neighboring cell information is obtained by a newly activated cell. The neighboring cell information includes PCIs of the cells neighboring the newly activated cell.

In exemplary embodiments of the present invention, neighboring cell information includes the information of cells working under a frequency different from the frequency of the newly activated cell, if any. The direct neighboring cell is a (detected, 301) cell which is adjacent to or overlapping with the newly activated cell. In an LTE system, an eNB that covers the newly activated cell sends a request to one or more eNBs serving direct neighbor cells of the newly activated cell through an X2 or S1 interface. Such a request may be, for example, an X2 SETUP REQUEST message or an X2 UPDATE message, or another newly added message.

302: PCI for the newly activated cell is set in accordance with the neighbor cell information.

In an embodiment in accordance with FIG. 3, PCI information included in the neighboring cell information may be removed from a PCI list stored by a cell, such as cell 3 in FIG. 9, so as to obtain a new or revised PCI list. A PCI is selected from the new PCI list and allocated to the newly activated cell. Alternatively, the neighboring cell information is reported by cell 3 to an Operation Administration Maintenance (OAM) system, and PCI is allocated to the newly activated cell by the OAM system.

In order to have a better understanding of the embodiments of the present invention, the method for obtaining the PCI of the newly activated cell disclosed in this embodiment and the concept of neighboring cells are explained in further detail below.

In an exemplary embodiment of the present invention, the eNB of a newly activated cell obtains a list of PCIs available to the newly activated cell. After obtaining the information of one or more neighboring cells of the newly activated cell, the eNB retrieves the PCIs of the one or more neighboring cells of the newly activated cell. According to the PCI of the neighboring cell, the eNB selects a PCI not used by the neighboring cells of the newly activated cell from the stored PCI list. When all PCIs in the PCI list are unavailable, the eNB obtains available PCIs from the OAM system. Consequently, the system efficiency is improved. Alternatively, after obtaining the information on the one or more neighboring cells, the eNB extracts the PCIs of the cells, e.g. operating on a frequency identical to the frequency of the newly activated cell, and sends the PCIs to the OAM system, and the OAM system allocates a PCI to the newly activated cell.

Neighboring cells described in exemplary embodiments of present invention may refer to one or more direct neighboring cells or one or more indirect neighboring cells of an existing cell. As used herein, with the concept of neighbor cell, a direct neighbor cell or indirect neighbor cell refers to a cell adjacent to or overlapping with the cell of origin or a cell adjacent to or overlapping with a direct neighboring cell, respectively. This does not exclude that the concept may also apply to a cell served by an eNB neighboring an eNB serving a cell of origin, a neighbor eNB, or a cell served by an eNB neighboring the neighbor eNB and not being the eNB serving the cell of origin.

Exemplary methods of allocating a PCI are described below.

Figure 4:
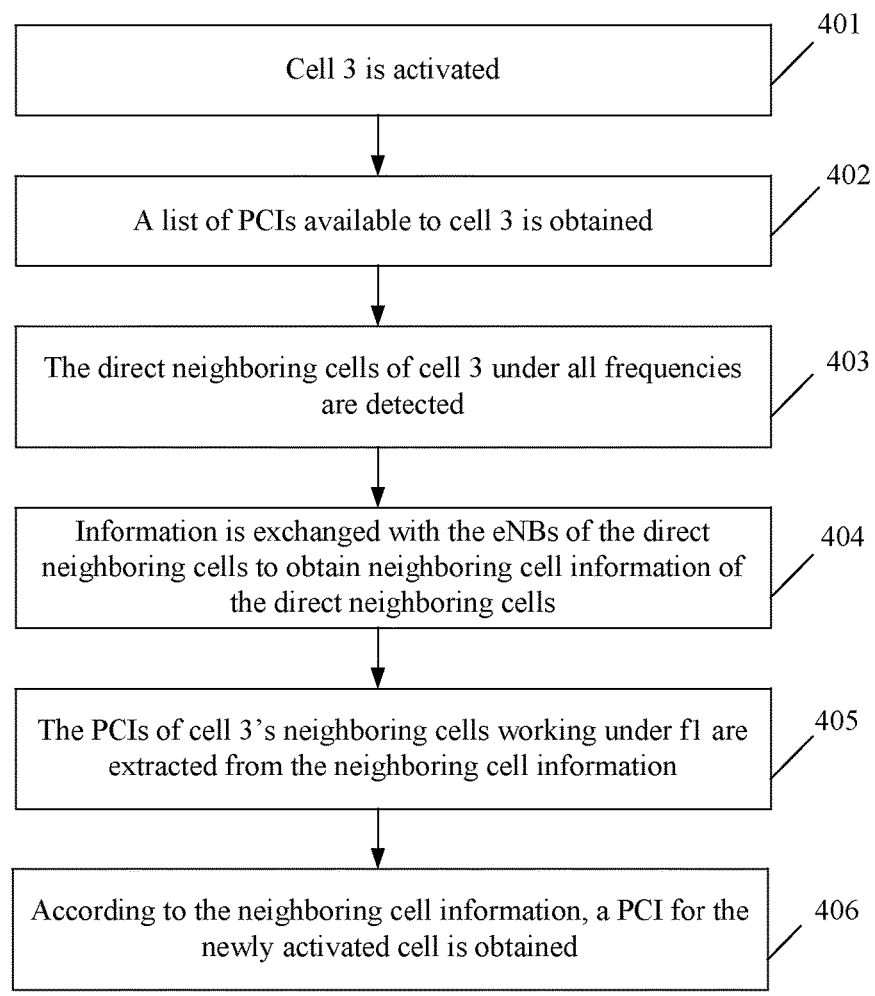
FIG. 4 is another flowchart of a method for allocating PCIs in an embodiment of the present invention.

FIG. 4 shows schematically a method according to a first embodiment of the invention, comprising:

401: A radio coverage cell such as cell 3 of FIG. 9 is activated.

402: A list of PCIs available to cell 3 is obtained.

In this embodiment, example eNB3 of FIG. 9 obtains a list of available PCIs under the frequency f1 from the OAM system. This step is optional. If the eNB3 sends the PCIs of the neighboring cells of cell 3 under f1 (namely, the neighboring cells of cell 3 that works under f1) to the OAM system in step 406, this step is omitted.

403: The direct neighboring cells of cell 3 under all frequencies are detected.

In this embodiment, eNB3 detects the direct neighboring cells under all frequencies through an integrated downlink detector. Alternatively, through an Automatic Neighbor Relation Function (ANR), eNB 3 detects cells 2, 4 and 7.

404: Information is exchanged with the eNBs of the direct neighboring cells to obtain neighboring cell information of the direct neighboring cells.

In this embodiment, eNB3 sends a request to each of eNB2, eNB4 and eNB7 through an X2 or S1 interface. The request includes an instruction parameter which instructs each of the neighboring cells, i.e. cells 2, 4 and 7, to send the neighboring cell information of their neighboring cells under the frequency f1. The neighboring cells of cells 2, 4 and 7 include direct neighboring cells and indirect neighboring cells. The neighboring cell information of cells 2, 4 and 7 includes the PCI information of the neighboring cells of cells 2, 4 and 7. eNB2, eNB4 and eNB7 respond to the request of eNB3 through an X2 or S1 interface, and return the PCI information of the direct neighboring cells and their respective neighboring cell lists to eNB3. The neighboring cell list returned by eNB2 to eNB3 includes the PCI information of cell 1; the neighboring cell list returned by eNB4 to eNB3 includes the PCI information of cell 5; and the neighboring cell list returned by eNB7 to eNB3 includes the PCI information of cell 6.

405: The PCIs of cell 3's neighboring cells working under f1 are extracted from the neighboring cell information.

In this embodiment, eNB3 extracts the PCIs of cells 1, 2, 4, 5 and 6 from the neighboring cell information.

406: According to the neighboring cell information, a PCI for the newly activated cell is obtained.

In this embodiment, eNB3 removes the PCIs of cells 1, 2, 4, 5, and 6 from the list of available PCIs obtained in step 402 so as to obtain a new PCI list, and eNB3 selects a PCI for the newly activated cell from the new PCI list. Alternatively, eNB3 reports the PCIs of the neighboring cells working under f1 to the OAM system. The OAM system selects an available PCI according to the reported PCIs already used by the neighboring cells and sends the selected PCI to eNB3.

A second embodiment of the present invention is described below.

Figure 5:
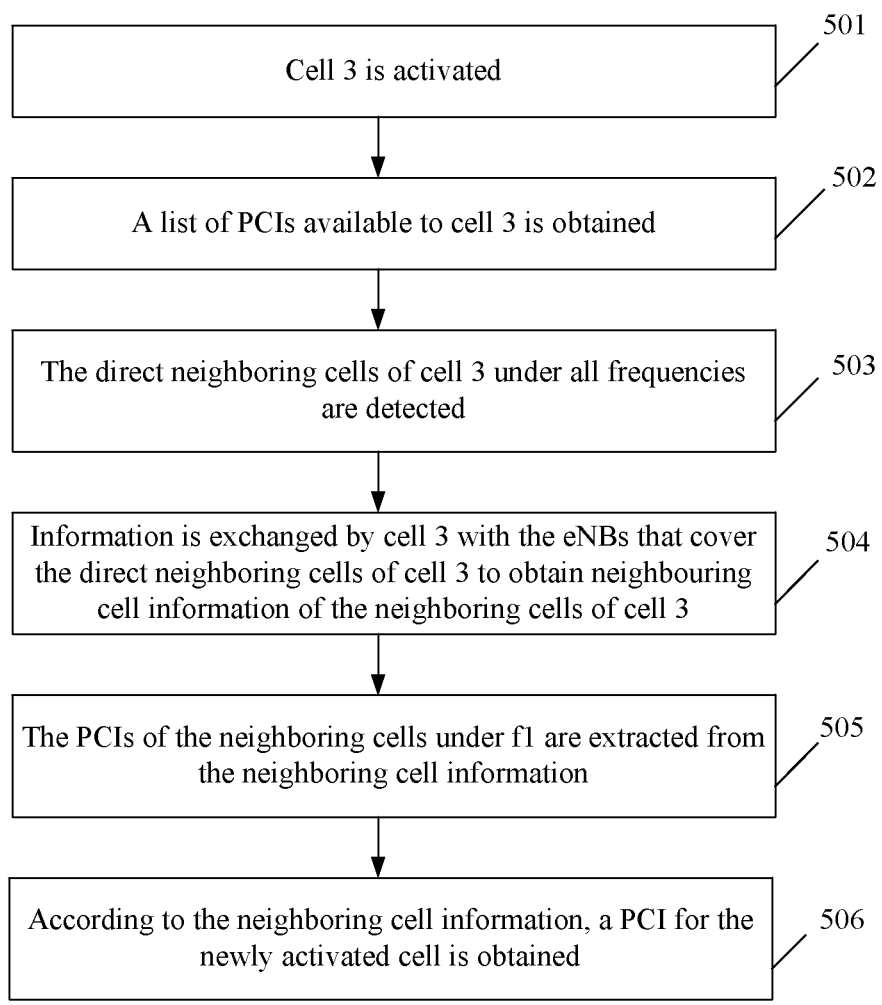
FIG. 5 is another flowchart of a method for allocating PCIs in an embodiment of the present invention.

As shown in FIG. 5, steps 501-503 in the second embodiment are similar to steps 401-403 described in the first embodiment of the present invention and are not repeated herein.

504: Information is exchanged between a cell such as example cell 3 of FIG. 9 and the eNBs that cover direct neighboring cells of cell 3 to obtain neighboring cell information of the neighboring cells of cell 3.

In this embodiment, eNB3 sends a request to each of eNB2, eNB4 and eNB7 through an X2 or S1 interface. The request includes an instruction parameter which instructs the neighboring cells, i.e. cells 2, 4 and 7, to send neighboring cell information of their direct neighboring cells and indirect neighboring cells. The neighboring cell information includes PCI information of the neighboring cells and Cell Global ID (CGI) information of the neighboring cells. The CGI of each cell is unique. A CGI of a cell is composed of a Public Land Mobile Communication Network (PLMN) ID, an eNB ID and a cell ID.

Through an X2 or S1 interface, each of eNB2, eNB4 and eNB7 responds to the request of eNB3, as an example eNB, by providing its neighboring cell information to eNB3 serving cell 3 (i.e. the PCI information and CGI information of each of cells 1, 2, 4, 5, 6 and 7).

505: The PCIs of the neighboring cells under f1 are extracted from the neighboring cell information.

In this embodiment, the frequency information of the cells is obtained through the CGIs of the cells by the following way:

1. The eNB3 sends a request to each of eNB2, eNB4 and eNB7 through an X2 or S1 interface, requesting to obtain the frequency information of all neighboring cells. The request includes the CGI information of neighboring cells. Each of eNB2, eNB4 and eNB7 responds to such a request sent by eNB3 respectively, and returns the frequency information of its neighboring cells to eNB3.

2. The eNB3 reports request information to the OAM system. If eNB3 and the target eNB with its frequency queried are in the same OAM system, the query for the frequency of the target eNB can be performed through the OAM system. If eNB3 and the target eNB with its frequency queried are in different OAM systems, the OAM system that covers the target cell performs the query for the frequency of the target eNB, and the target cell sends the obtained frequency information to eNB3.

After eNB3 obtains the frequency information of the neighboring cells of cell 3, the PCIs of the neighboring cells working under the frequency f1 are extracted, namely, the PCIs of cells 1, 2, 4, 5 and 6 are extracted.

Step 506 is similar to step 406, and is not repeated herein.

The third embodiment of the present invention is described below.

Figure 6:
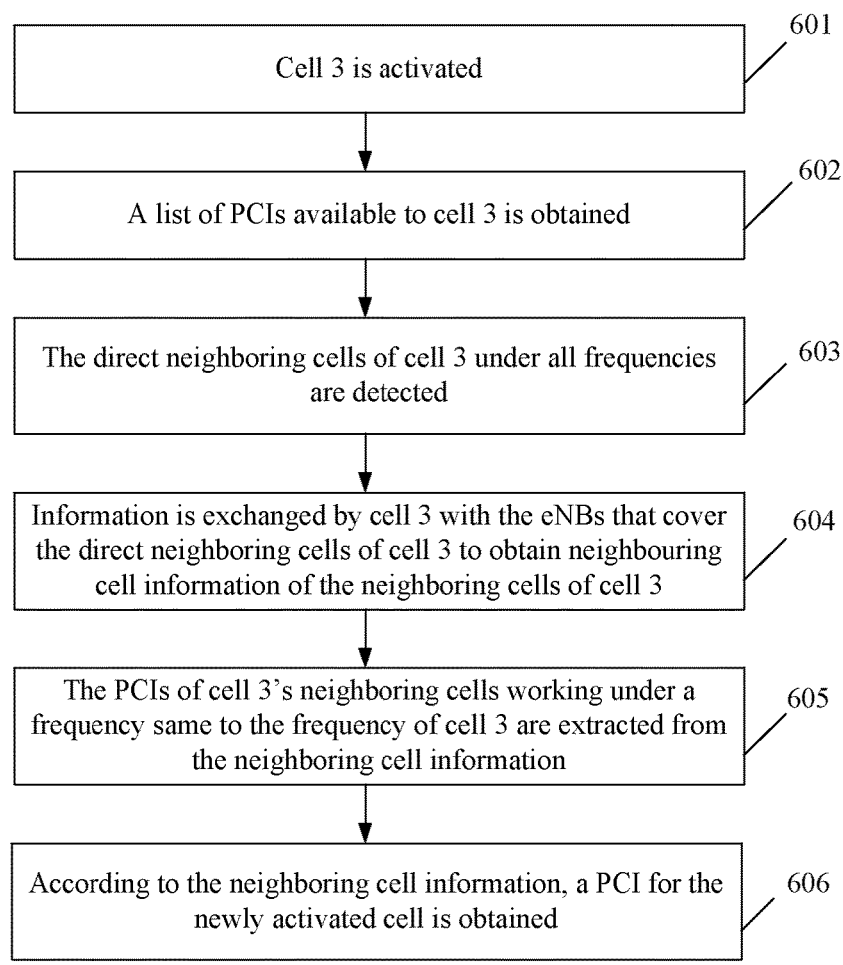
FIG. 6 is another flowchart of a method for allocating PCIs in an embodiment of the present invention.

As shown in FIG. 6, steps 601-603 in the third embodiment are similar to steps 401-403 in the first embodiment of the present invention, and are not repeated herein.

604: Information is exchanged by eNB3/cell 3, as an example, with the eNBs that cover the direct neighboring cells of cell 3 to obtain neighboring cell information of the neighboring cells of cell 3.

In this embodiment, eNB3 sends a request to eNB2, eNB4 and eNB7 through an X2 or S1 interface, requesting to obtain neighboring cell information of all neighboring cells of cell 3. The neighboring cell information includes PCI information, CGI information and frequency information of neighboring cells, or includes the PCI information and the frequency information.

Through an X2 or S1 interface, each of eNB2, eNB4 and eNB7 responds to the request of eNB3 by providing its cell information to eNB3 serving cell 3 (i.e. PCI, CGI and frequency information of each of cells 2, 4, and 7) and preferably by providing its neighboring cell information (i.e. PCI, CGI and frequency information of each of cells 1, 5 and 6).

In this embodiment, if both frequency information and CGI information are included in the information exchange with eNB3, eNB3 does not need to obtain the frequency information according to the CGI, e.g., from OAM. Moreover, after obtaining the CGI information, the measurement performed by the UE for the CGI is reduced in the subsequent ANR process. Moreover, the obtained CGI facilitates obtaining more information about the neighboring cells.

605: The PCIs of cell 3's neighboring cells operating on a frequency identical to the frequency of cell 3 are extracted from the neighboring cell information.

In this embodiment, eNB3 extracts the PCIs of the neighboring cells under the frequency f1, i.e. the PCIs of cells 1, 2, 4, 5, and 6.

Step 606 is similar to step 406, and is not repeated herein.

The fourth embodiment of the present invention is described below.

Figure 7:
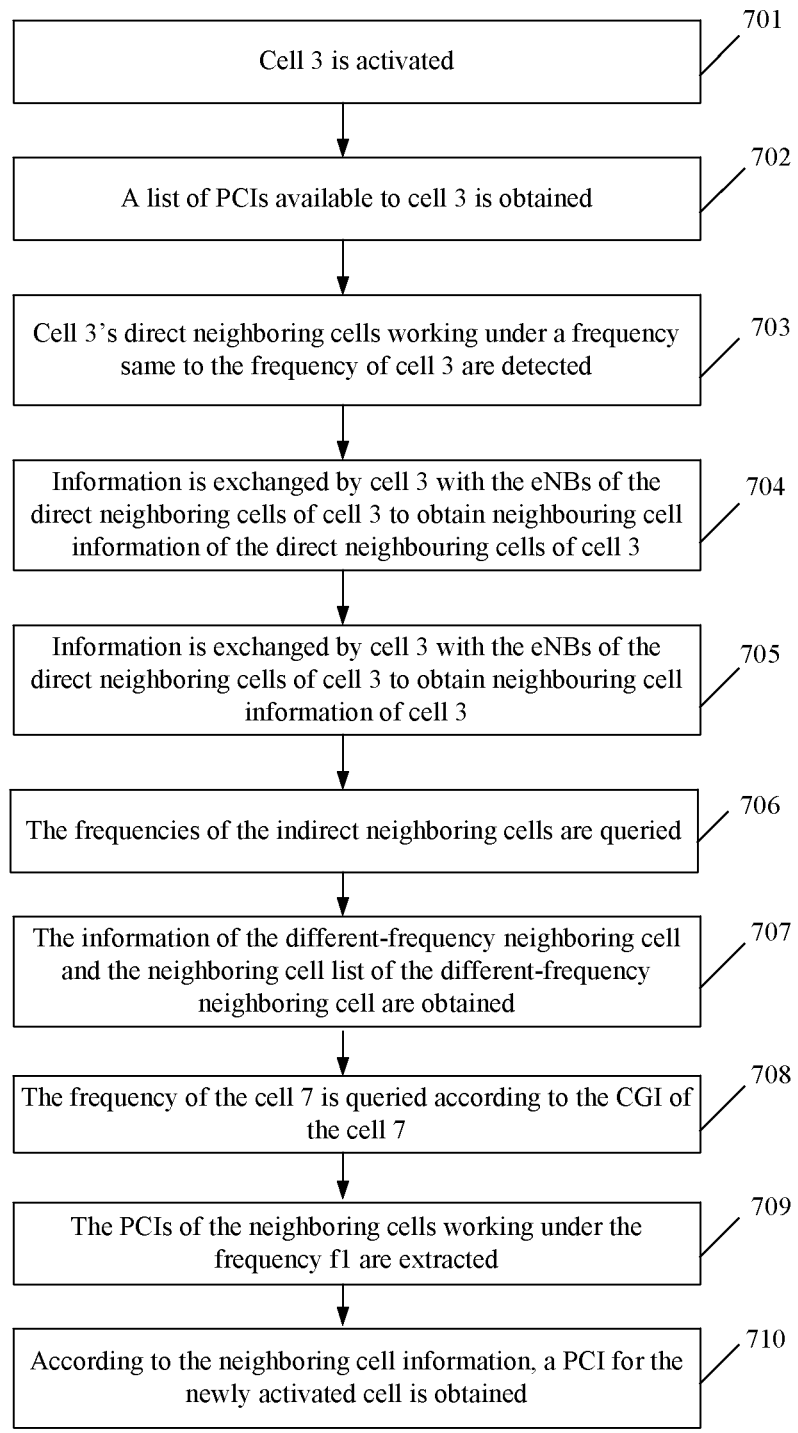
FIG. 7 is another flowchart of a method for allocating PCIs in an embodiment of the present invention.

As shown in FIG. 7, step 701 and step 702 are similar to step 401 and step 402 in the first embodiment, and are not repeated herein.

703: An example cell's 3 direct neighboring cells working under a frequency identical to the frequency of cell 3 are detected.

In this embodiment, with the downlink detector or the ANR function being integrated in eNB3 serving example cell 3, eNB3 detects cells 2 and 4.

704: Information is exchanged by cell 3 with the eNBs of the direct neighboring cells of cell 3 to obtain neighboring cell information of the direct neighboring cells of cell 3.

In this embodiment, eNB3 sends a request to each of eNB2 and eNB4 through an X2 or S1 interface to request for the neighboring cell lists of cell 2 and cell 4 as well as the information of cell 2 and cell 4.

Each of eNB2 and eNB4 responds to the request of eNB3, and then sends the PCI and the CGI of cell 2 and cell 4, as well as the neighboring cell list of all frequencies of cell 2 and cell 4 to eNB3.

The neighboring cell list of cell 2 includes the PCI and the CGI of cell 1 and cell 7; and the neighboring cell list of cell 4 includes the PCI and the CGI of cell 5 and cell 7.

705: Information is exchanged by cell 3 with the eNBs of the direct neighboring cells of cell 3 to obtain neighboring cell information of cell 3.

706: The frequencies of the indirect neighboring cells are queried.

In this embodiment, eNB3 queries the frequencies of the indirect neighboring cells of cell 3 through the CGI. The detailed query method is the same as the query method described in step 505.

After identifying that the frequency of cell 7 is f2 which is different from the working frequency of cell 3, eNB3 regards the cell 7 as a different-frequency neighboring cell which is a cell having a frequency different to the frequency of the cell 3.

707: The information of the different-frequency neighboring cell and the neighboring cell list of the different-frequency neighboring cell are obtained.

In this embodiment, eNB3 exchanges information with eNB7 through an X2 or S1 interface, and obtains the PCI, the CGI and the neighboring cell list of cell 7.

The neighboring cell list of cell 7 includes the PCI and the CGI of the direct neighboring cells of cell 7.

In this step, the PCI and the CGI of the direct neighboring cell 6 of cell 7 are obtained.

708: The frequency of the cell 7 is queried according to the CGI of the cell 7.

In this embodiment, the detailed query method is the same as the query method in step 505.

709: The PCIs of the neighboring cells working under the frequency f1 are extracted.

In this embodiment, eNB3 selects the neighboring cells according to the frequency information obtained in steps 706 and 708, and extracts the PCIs of the neighboring cells whose frequency is f1; and eNB3 extracts the PCIs of cells 1, 2, 4, 5, and 6.

Step 710 is similar to step 406, and is not repeated herein.

The fifth embodiment of the present invention is described below.

Figure 8:
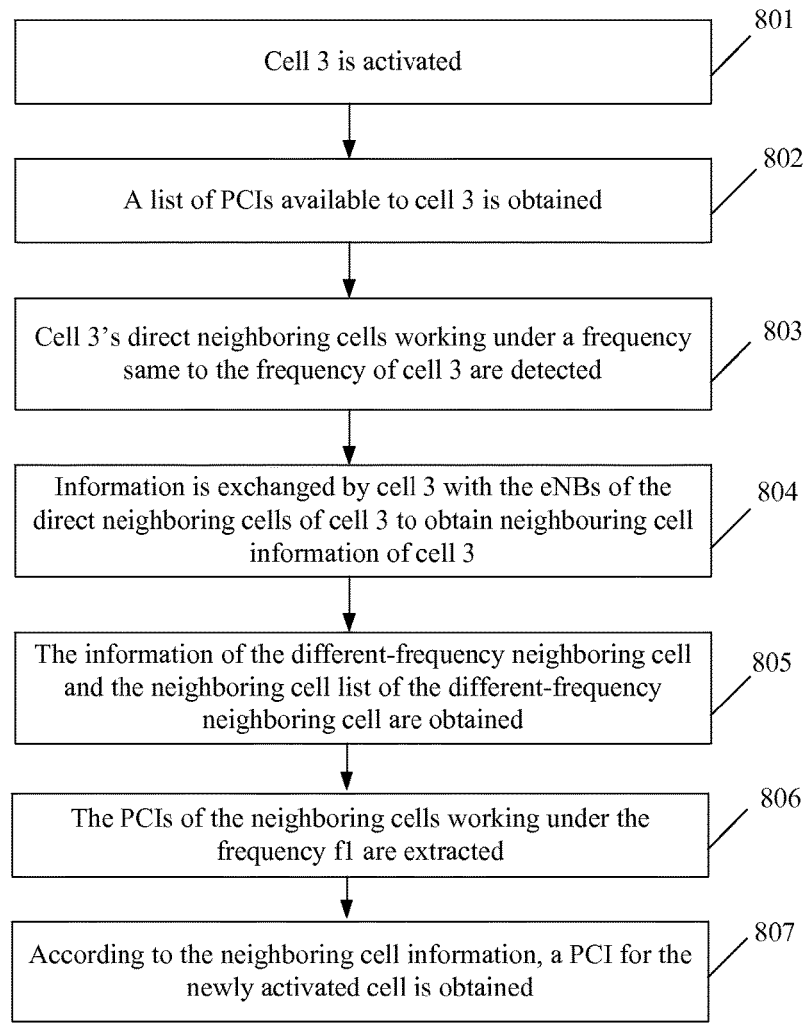
FIG. 8 is another flowchart of a method for allocating PCIs in an embodiment of the present invention.

As shown in FIG. 8, steps 801-803 in this embodiment are similar to steps 701-703 in the first embodiment of the present invention, and are not repeated herein.

804: Information is exchanged by cell 3 with the eNBs of the direct neighboring cells of cell 3 to obtain neighboring cell information of cell 3.

In this embodiment, eNB3 exchanges information through an X2 or 51 interface, and obtains the PCI, the CGI and the frequency information of cell 4, or obtains the PCI and the frequency information of cell 4, and obtains neighboring cell lists of cell 2 and cell 4.

Each of eNB2 and eNB4 responds to the request of eNB3 by sending the PCI, the CGI and the frequency information of each of cell 2 and cell 4 to eNB3, or by sending the PCI and the frequency information of each of cell 2 and cell 4 to eNB3 and sending the neighboring cell lists of all frequencies of each of cell 2 and cell 4 to eNB3.

The neighboring cell list of cell 2 includes the PCI, the CGI and the frequency information of cell 1 and cell 7, or includes the PCI and the frequency information of cell 1 and cell 7. The neighboring cell list of cell 4 includes the PCI, the CGI and the frequency information of cell 5 and cell 7, or includes the PCI and the frequency information of cell 5 and cell 7.

eNB3 determines that cell 7 working under frequency f2 is a different-frequency neighboring cell of cell 3.

805: The information of the different-frequency neighboring cell and the neighboring cell list of the different-frequency neighboring cell are obtained.

In this embodiment, eNB3 exchanges information with eNB7 through an X2 or S1 interface, and obtains the PCI, the CGI and the neighboring cell list of cell 7.

The neighboring cell list of cell 7 includes the PCI, the CGI and the frequency information or includes the PCI and the frequency information of the direct neighboring cells of cell 7.

In this step, the information of cells 1, 2, 4, 5 and 6, which are direct neighboring cells of cell 7, is obtained.

Steps 806-807 are similar to steps 709-710 in the fourth embodiment, and are not repeated herein.

Figure 10:
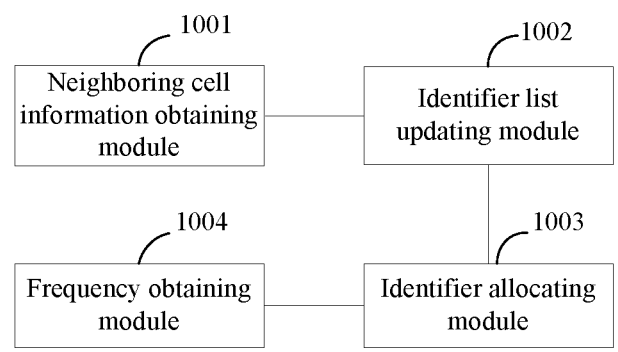
FIG. 10 shows a structure of an eNB in an embodiment of the present invention.

An eNB is disclosed in an exemplary embodiment of the present invention. As shown in FIG. 10, the eNB includes a neighboring cell information obtaining module 1001, an identifier list updating module 1002 and an identifier allocating module 1003. The neighboring cell information obtaining module 1001 is configured to obtain neighboring cell information from an eNB of a direct neighboring cell of a newly activated cell, where the neighboring cell information includes PCI information of neighboring cells of the eNB, the neighboring cells include one or more cells working under a frequency which is different to a frequency of the newly activated cell, and the direct neighboring cell is a cell adjacent to or overlapped with the newly activated cell. The identifier list updating module 1002 is configured to remove the PCI information of the newly activated cell's neighboring cells working under a frequency which is same to the frequency of the newly activated cell from a PCI information list of PCIs available to the newly activated cell, and to obtain a new PCI information list of PCIs available to the newly activated cell. The identifier allocating module 1003 is configured to select a PCI for the newly activated cell from the new PCI information list obtained by the identifier list updating module 1002.

Alternatively, the neighboring cell information obtaining module 1001 is further configured to obtain neighboring cell information of the direct neighboring cells and the indirect neighboring cells from the eNB of the direct neighboring cell of the newly activated cell, where an indirect neighboring cell is a cell adjacent to or overlapped with a direct neighboring cell. Alternatively, the neighboring cell information obtaining module 1001 is configured to obtain neighboring cell information of one or more neighboring cells working under a frequency same to the frequency of the newly activated cell from all the eNBs of the direct neighboring cells of the newly activated cell. Alternatively, the neighboring cell information obtaining module 1001 is configured to obtain neighboring cell information about the neighboring cells working under all frequencies from all the eNBs that cover the direct neighboring cells of the newly activated cell, where the neighboring cell information further includes the CGI of the neighboring cells working under all frequencies, or further includes the CGI and the frequency information of the neighboring cells working under all frequencies. Alternatively, the neighboring cell information obtaining module 1001 is configured to obtain neighboring cell information of the neighboring cells working under all frequencies from the eNBs that cover the one or more direct neighboring cells of the newly activated cell, which one or more direct neighboring cells have a frequency same to the frequency of the newly activated cell, where the neighboring cell information includes PCI information and CGI information, or includes PCI information, CGI information, and frequency information, and the direct neighboring cells include cells working under a frequency different to the frequency of the newly activated cell. The detailed method for obtaining the neighboring cell information is described in the foregoing method embodiments, and is not repeated herein.

If the obtained neighboring cell information under all frequencies includes only the PCI and the CGI, the eNB further includes a frequency obtaining module 1004, which is configured to obtain the corresponding frequency information from the eNB or the OAM system that covers the direct neighboring cells of the newly activated cell according to the CGI.

Figure 11:
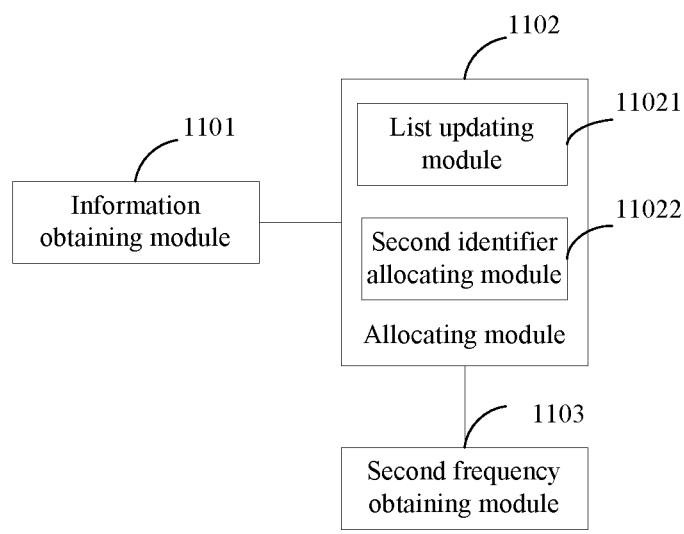
FIG. 11 shows a structure of an apparatus for allocating PCIs in an embodiment of the present invention.

As shown in FIG. 11, an apparatus for allocating a PCI is disclosed in an exemplary embodiment of the present invention. The apparatus includes an information obtaining module 1101 and an allocating module 1102.

The functions of the information obtaining module 1101 are the same as the functions of the neighboring cell information obtaining module 1001 in the foregoing embodiment, and are not repeated herein.

The allocating module 1102 is configured to obtain the PCI of the newly activated cell according to the neighboring cell information obtained by the information obtaining module 1101. Specifically, the allocating module may further include a list updating module 11021 and a second identifier allocating module 11022. The functions of the two modules are the same as the functions of the identifier list updating module 1002 and the identifier allocating module 1003 respectively in the foregoing embodiment, and are not repeated herein. Further, the allocating module 1102 is configured to send the PCI of the newly activated cell's neighboring cell working under a frequency same to the frequency of the newly activated cell to the OAM system, and receive the PCI allocated by the OAM system to the newly activated cell.

Alternatively, if the obtained neighboring cell information under all frequencies includes only PCI and CGI, the apparatus further includes a second frequency obtaining module 1103. Its functions are the same as the functions of the frequency obtaining module 1004 in the foregoing embodiment, and are not repeated herein.

Figure 12:
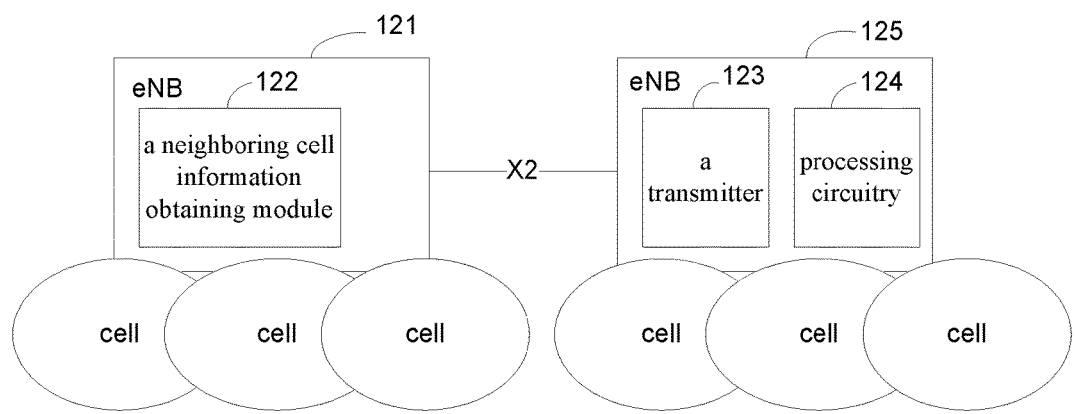
FIG. 12 shows a structure of two apparatuses of a wireless communications system.

FIG. 12 illustrates schematically two apparatuses (121, 125), e.g. eNBs, of a wireless communications system. The apparatuses are preferably interconnected over an X2 interface. As a non-exclusive example each of the eNBs (121, 125) serves three cells. One of the exemplary apparatuses comprises a neighboring cell information obtaining module (122), as described in relation to FIG. 10. The other exemplary apparatus (125) comprises processing circuitry (124) and a transmitter (123). The processing circuitry is arranged to compile a signaling message comprising neighboring cell information inclusive of PCI and preferably also related operating one or more frequencies as described in detail above. The apparatus (125) also comprises a transmitter for conveying compiled signaling messages to neighboring eNBs (121) in the cellular communication system.

The methods disclosed in the embodiments of the present invention are not limited to the LTE system. Accordingly, the apparatus for allocating a PCI may be implemented by an eNB or a network-side entity in other systems. Such a network-side entity in other systems may, for instance, be the RNC in a WCDMA system or the BSC in a GSM system. Alternatively, the apparatus for allocating a PCI may be an independent function entity.

Although embodiments of the present invention have been described herein with respect to certain exemplary features, aspects and embodiments thereof, the present invention is not intended to be limited to such exemplary features, aspects and embodiments shown herein. It is apparent to those skilled in the art that numerous modifications, variations and other embodiments may be made to the exemplary features, aspects and embodiments thereof without departing from the spirit and scope of the invention. Therefore, the present invention is intended to cover those numerous modifications, variations and other embodiments and the scope of protection of the present invention are indicated by the claims appended thereto and their equivalents.

What is claimed is:

1. A method for obtaining physical cell identifier (PCI) for a first cell among cells in a wireless cellular communication system, comprising:
   obtaining a first list of available PCIs for the first cell;
   obtaining, for the first cell, second PCIs of detected cells among the cells by communicating frequency information and the second PCIs over X2 interface; and
   selecting, for the first cell, a PCI, wherein the selected PCI is one of the available PCIs in the first list and not any one of the second PCIs.

2. The method according to claim 1, wherein to obtain the first list of available PCIs, a first base station serving the first cell receives the first list from an Operation Administration Maintenance (OAM) system.

3. The method according to claim 1, wherein the frequency information is frequency channel number.

4. The method according to claim 1, wherein a first base station serving the first cell obtains the second PCIs by receiving the second PCIs contained in at least one X2 setup response message from at least one neighboring base station of the first base station.

5. The method according to claim 4, wherein the at least one neighboring base station sends PCIs of all neighboring cells of the first cell;
   wherein neighboring cells comprise direct neighboring cells and indirect neighboring cells.

6. The method according to claim 5, wherein the second PCIs include PCIs of all neighboring cells of the first cell.

7. The method according to claim 5, wherein the second PCIs include PCIs of the first cell's neighboring cells which have a same operating frequency as the first cell;
   wherein the operating frequency of the neighboring cells is contained in the X2 setup response message.

8. The method according to claim 4, wherein the at least one neighboring base station sends PCIs of the first cell's neighboring cells which have same operating frequency as the first cell;
   wherein the operating frequency of the first cell is contained in an X2 setup request message;
   wherein neighboring cells comprise direct neighboring cells and indirect neighboring cells.

9. The method according to claim 8, wherein the second PCIs include PCIs of the first cell's neighboring cells which have the same operating frequency as the first cell.

10. The method according to claim 1, wherein a cell global identifier is communicated over the X2 interface.

11. A base station for obtaining physical cell identifier (PCI) in a wireless cellular communication system, comprising a receiver, a transmitter and a processor, wherein the processor is configured to:
   receive, via the receiver, an X2 setup request message of other base station, wherein the X2 setup request message includes information of operating frequency of a first cell;
   send, via the transmitter, an X2 setup response message,
   wherein:
      the X2 setup response message includes information of the first cell's at least one neighboring cell, and
      the information of the first cell's at least one neighboring cell comprises at least one second PCI of the first cell's at least one neighboring cell, which is used for selection of a PCI for the first cell.

12. A non-transitory computer-readable medium having stored thereon computer-executable instructions for obtaining physical cell identifier (PCI) for a first cell among cells in a wireless cellular communication system, wherein the instructions when executed by a processor of a base station cause the processor to perform:
   receiving an X2 setup request message of other base station, wherein the X2 setup request message includes information of operating frequency of a first cell;
   sending an X2 setup response message,
   wherein:
      the X2 setup response message includes information of the first cell's at least one neighboring cell, and
      the information of the first cell's at least one neighboring cell comprises at least one second PCI of the first cell's at least one neighboring cell, which is used for selection of a PCI for the first cell.

13. A method for communicating physical cell identifier (PCI) in a wireless cellular communication system, comprising:
   receiving, by a base station, an X2 setup request message of other base station, wherein the X2 setup request message includes information of operating frequency of a first cell;
   sending an X2 setup response message,
   wherein:
      the X2 setup response message includes information of the first cell's at least one neighboring cell, and
      the information of the first cell's at least one neighboring cell comprises at least one second PCI of the first cell's at least one neighboring cell, which is used for selection of a PCI for the first cell.

14. The base station according to claim 11, wherein the information of the first cell's at least one neighboring cell further comprises information of operating frequency.

15. The base station according to claim 14, wherein the information of operating frequency is frequency channel number.

* * * * *